Patented Feb. 20, 1923.

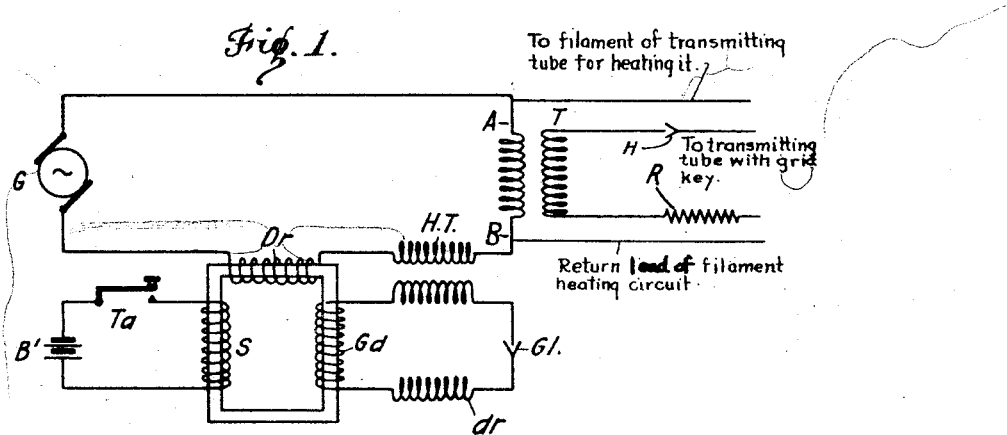
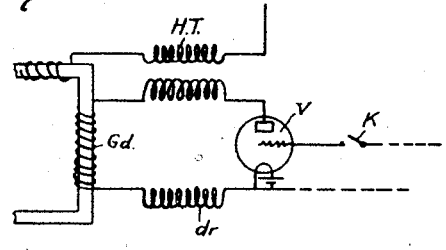

1,446,434

UNITED STATES PATENT OFFICE.

WALTER SCHAFFER AND FRITZ KRUSCHINSKY, OF BERLIN, GERMANY.

CIRCUIT ARRANGEMENT FOR USE IN THE TRANSMISSION OF SIGNALS.

Application filed August 18, 1922. Serial No. 582,614.

*To all whom it may concern:*

Be it known that we, WALTER SCHAFFER and Dr. FRITZ KRUSCHINSKY, citizens of the Republic of Germany, and residents of Hallesches Ufer 12/13, Berlin, Germany, have invented new and useful Improvements in Circuit Arrangements for Use in the Transmission of Signals, for which an application, No. G. 54,535, was filed in Germany on August 5, 1921, and of which the following is a specification accompanied by drawings.

It is well known that the resistance of an alternating current circuit may be varied within wide limits by inserting an iron core choke coil into the circuit and more particularly by varying the direct current premagnetization of the coil. The present invention relates to special means of this character which serves particularly for controlling the alternating current feed of cathode tube senders (transmitting tubes).

In the drawing,

Fig. 1 is a diagrammatic representation of a circuit arrangement embodying the invention, and Fig. 2 is a diagrammatic representation of a circuit arrangement of modified form.

In accordance with the present invention and as shown in the drawing, the choke coil $Dr$ is inserted in the generator circuit in series with the transformer T, the choke coil being provided with a winding $Gd$ for the purpose of direct current premagnetization. Furthermore, the alternating current circuit of the generator G comprises a special transformer HT the secondary winding of which is in a circuit including a rectifier $Gl$ of any desired type, which converts the alternating current induced in the secondary winding of the transformer HT into direct current. The direct current in the second-mentioned circuit varies in accordance with the current load of the generator G and is connected to the premagnetizing winding $Gd$ of the choke coil $Dr$, preferably through a choke coil $dr$. If the load on the secondary of the main transformer T is varied, then the current load of the generator G is varied accordingly, which in turn causes variation of the direct current delivered by the rectifier to the premagnetization winding $Gd$ and thereby also of the apparent resistance of the coil $Dr$. The variation occurs in such a manner that when the load on the transformer T is decreased the apparent resistance of coil $Dr$ is increased, and when the load is increased, the resistance is decreased. By properly dimensioning the choke coils, transformers, etc., the changes in potential in the circuit of the generator G, which ordinarily result from changes in the load on the circuit may be exactly neutralized by the variation in the apparent resistance of the choke coil $Dr$. In other words, by properly dimensioning the elements of the generator and direct current circuits, constant potential may be caused to exist, for example, at the terminals of the resistance R independently of changes in its value or at points A, B of the transformer T independently of its load. The resistance R is intended to represent the resistance of the transmitting tube. This circuit arrangement may be used to good advantage for various purposes, e. g. (1) if a further rectifying arrangement is connected to the secondary winding of the transformer T for the purpose of feeding a tube sender, and if the tube sender is operated in the well known manner through the agency of a so-called grid key, that is, a key in its grid-filament circuit for opening and closing it, then, by means of the above described arrangement the potential supplied to the tube may be caused to remain constant independently of the open or closed condition of the key; (2) if the auxiliary means used in the circuit are so proportioned that the alternating potential at the points A, B of the transformer T is constant independently of the load on the transformer, then it will be possible to branch off a conductor from points A, B leading to the heating filaments, e. g. of the above described sender tubes. In this case the heating current remains constant independently of the operation of the key, whereas the potential of the anode direct current fed to the tubes varies within certain limits due to the potential losses in the secondary winding of the transformer T, etc. If, however, it is desired that the direct current supplied be also maintained constant, then this may be accomplished by the double use of the above described elements.

The drawing also represents a further embodiment of the circuit arrangement which consists in providing a coil S on the core carrying the choke coil $Dr$ and the direct current premagnetization winding $Gd$. This coil may, for instance, be used for the purpose of making possible the actuation of the sender by means of the main current. If the coil is connected in series with a key Ta and a direct current source B', then, by actuating the key Ta, the premagnetization of the choke coil Dr and therefore its apparent resistance may be varied within certain limits and the control of the sender thereby accomplished. This method of controlling the sender by interruption of the main current may be used instead of interrupting the grid circuit as mentioned above. Obviously in both cases the key Ta may be replaced by an arrangement used in telephony, e. g. by a cathode tube the grid potential of which is modulated by speech.

It should be noted that the whole arrangement is adjustable to the transformer HT for the purpose of making possible the desired tuning. This may for instance be accomplished in such a manner that a variable resistance is connected in parallel with the primary or secondary of the transformer HT or the premagnetizing winding Gd.

Instead of varying the premagnetization of the choke coil by the rhythm of the key or telephone through the agency of the coil S, another means may be used for this purpose. This consists in using a valve V, Fig. 2, provided with a grid, in the place of the rectifier Gl in the direct current circuit. As is well known, such valves operate as rectifiers. However, the direct current that they permit to pass may be made dependent on the grid potential. If the grid potential of the rectifying tube is varied in the well known manner by actuating the key K, then, the premagnetization of the coil Dr will also be varied.

Furthermore, in the case of speech or key rhythm the premagnetization may be varied in such a manner that the current supply by auxiliary transformer HT is controlled by means of suitable rectifiers.

Having described our invention, what we claim is:

1. A circuit arrangement comprising an alternating current generator, an inductive resistance device in the circuit of said generator including a choke coil, a transformer having its primary in the generator circuit and its secondary in a direct current circuit for magnetizing the core of the choke coil, and a rectifier in the direct current circuit, said generator circuit and said direct current circuit having their elements including the transformer and the choke coil so dimensioned and coupled as to maintain a constant potential in the generator circuit regardless of variation in the load on said circuit.

2. An arrangement for controlling the potential of a cathode tube sender, comprising an alternating current generator, a choke coil in the circuit of said generator, a transformer adapted to be connected to the tube sender and having its primary in said generator circuit, a second transformer also having its primary in the generator circuit and having its secondary in a direct current circuit for magnetizing the choke coil, and a rectifier in said direct current circuit, said generator circuit and said direct current circuit having their elements including the transformer and the choke coil so dimensioned and coupled as to cause the potential supplied to the cathode tube to remain constant regardless of changes in the load on the generator circuit.

3. A circuit arrangement for use in the transmission of signals, comprising an alternating current generator, an inductive resistance device in the circuit of said generator including a choke coil, a transformer having its primary in the generator circuit and its secondary in a direct current circuit for magnetizing the core of the choke coil, a rectifier in the direct current circuit, a third circuit having a winding electrically connected with said inductive resistance device to vary the resistance of said device and means for controlling the flow of current in said third circuit for the transmission of signals.

4. A circuit arrangement for use in the transmission of signals, comprising an alternating current generator, an inductive resistance device in the circuit of said generator including a choke coil, a transformer having its primary in the generator circuit and its secondary in a direct current circuit for magnetizing the core of the choke coil, and a cathode tube in the direct current circuit for rectifying the current induced into said circuit from the transformer and varying the premagnetization of said inductive resistance device so as to enable a signal to be given by modulation of the current in the main generator circuit.

5. A circuit arrangement for use in the transmission of signals, comprising an alternating current generator, an inductive resistance device in the circuit of said generator including a choke coil, a transformer having its primary in the generator circuit and its secondary in a direct current circuit for magnetizing the core of the choke coil, and a cathode tube in the direct current circuit for rectifying the current induced into said circuit from the transformer, said cathode tube being provided with a grid whereby a signal can be given by varying the potential impressed on the grid and thereby varying the pre-magnetization of the inductive resistance device and the current in the main generator circuit.

WALTER SCHAFFER.
Dr. FRITZ KRUSCHINSKY.